(12) United States Patent
Mason

(10) Patent No.: US 7,790,994 B2
(45) Date of Patent: Sep. 7, 2010

(54) DRAW-OUT POWER CELL DISCONNECT AND ISOLATION MECHANISM WITH RACK-OUT GUIDE TRAY

(75) Inventor: Anthony S. Mason, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 767 days.

(21) Appl. No.: 11/736,126

(22) Filed: Apr. 17, 2007

(65) Prior Publication Data

US 2008/0094782 A1   Apr. 24, 2008

Related U.S. Application Data

(60) Provisional application No. 60/862,130, filed on Oct. 19, 2006.

(51) Int. Cl.
*H01H 33/46* (2006.01)
(52) U.S. Cl. .................... 200/50.21; 200/50.24
(58) Field of Classification Search ... 200/50.21–50.27; 361/605–621
See application file for complete search history.

(56) References Cited

U.S. PATENT DOCUMENTS

| 3,193,633 | A | * | 7/1965 | Netzel et al. | 200/50.24 |
|---|---|---|---|---|---|
| 4,038,585 | A | * | 7/1977 | Wolski et al. | 361/624 |
| 4,317,160 | A | * | 2/1982 | Tillson et al. | 361/609 |
| 4,926,286 | A | * | 5/1990 | Maki et al. | 361/617 |
| 5,206,468 | A | * | 4/1993 | Kobayashi et al. | 200/50.23 |
| 5,343,355 | A | * | 8/1994 | Ishikawa | 361/617 |
| 5,486,978 | A | * | 1/1996 | Fishovitz | 361/617 |
| 5,757,260 | A | * | 5/1998 | Smith et al. | 337/186 |
| 6,563,062 | B2 | * | 5/2003 | Kurano et al. | 200/50.24 |
| 7,348,505 | B2 | * | 3/2008 | Kashyap et al. | 200/50.22 |
| 7,368,674 | B2 | * | 5/2008 | Parker et al. | 200/50.21 |

\* cited by examiner

*Primary Examiner*—Michael A Friedhofer
(74) *Attorney, Agent, or Firm*—Fay Sharpe LLP; Alexander R. Kuszewski; John M. Miller

(57) ABSTRACT

Methods and integrated apparatus are disclosed for electrically disconnecting and allowing external support and access for electrical devices in a power conversion system cabinet. The apparatus includes a support structure that translates a power conversion system component at least partially through a door or other cabinet opening between a first position with the component entirely within the cabinet and a second position with the component supported at least partially outside the cabinet, as well as a power disconnect apparatus operated by translation of the support structure to disconnect the component from electrical power when the support is translated from the first position to the second position.

19 Claims, 16 Drawing Sheets

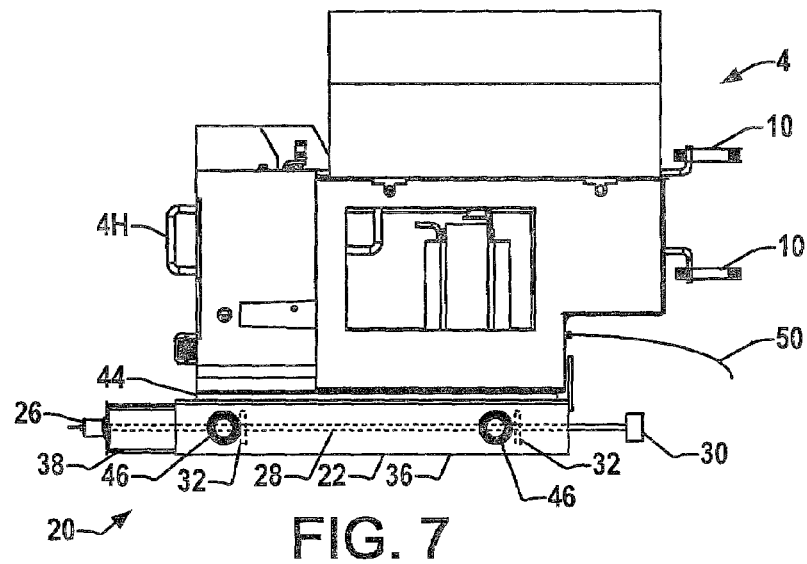
FIG. 7
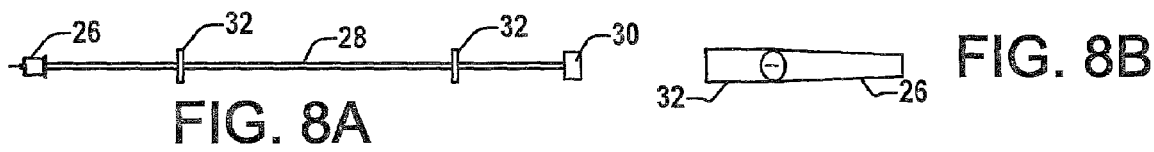
FIG. 8A
FIG. 8B
FIG. 8C
FIG. 8D
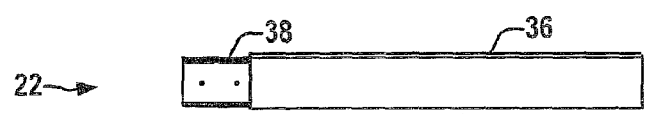
FIG. 9A
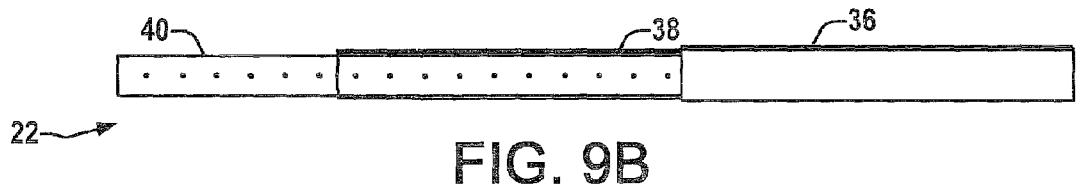
FIG. 9B

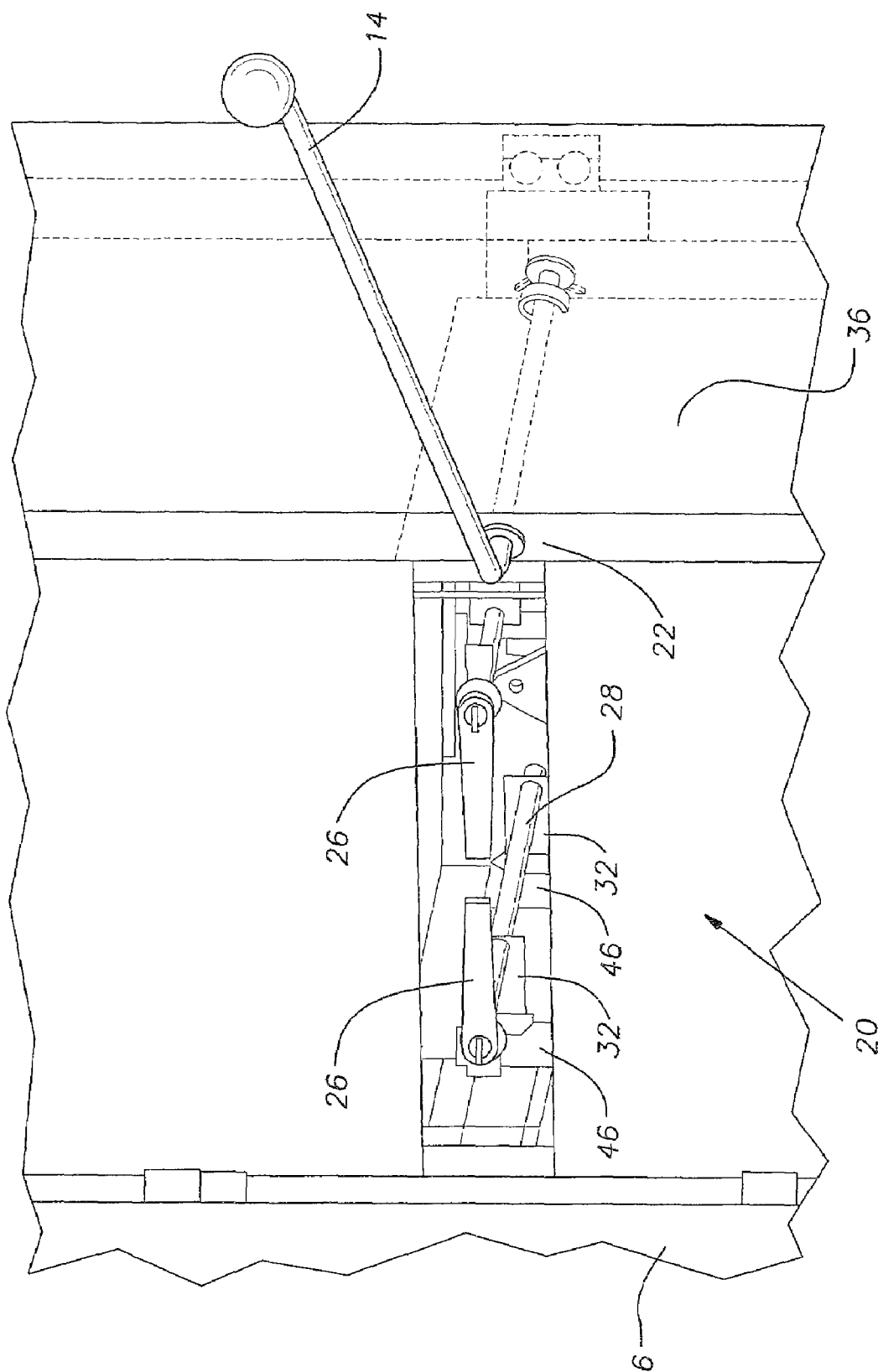

DRAW-OUT POWER CELL DISCONNECT AND ISOLATION MECHANISM WITH RACK-OUT GUIDE TRAY

REFERENCE TO RELATED APPLICATION

This application claims priority to and the benefit of U.S. Provisional Patent Application Ser. No. 60/862,130, filed Oct. 19, 2006, entitled DRAW-OUT POWER CELL DISCONNECT AND ISOLATION MECHANISM INCORPORATED WITH RACK-OUT GUIDE TRAY, the entirety of which is hereby incorporated by reference.

FIELD OF THE INVENTION

The present invention relates generally to electrical power conversion and more particularly to apparatus and methods for safely disconnecting and withdrawing motor drive and other power conversion system components from cabinets.

BACKGROUND

Power conversion systems are employed in medium voltage motor drives and other applications in which electrical power is converted for driving electric motors or other loads. Such systems can include motor drives, starters, power conditioning equipment, etc., and are generally housed in cabinets to protect the system components from dirt or other contaminants as well as to prevent exposure of operating personnel to high voltages and currents present inside the cabinet. In this respect, medium voltage motor drives typically include transformers, contactors, switches, starter components, and other high power electronic devices that may include exposed terminals carrying tens or hundreds of amps and which may be at hundreds or even thousands of volts potential with respect to ground. Closed cabinetry thus serves to prevent inadvertent contact by operators or other personnel with live components of motor drives, starters, and other power conversion systems during normal system operation. Often, however, maintenance must be performed on system components, and the cabinet enclosure must be opened to allow access for observing, testing, repairing and/or replacing system devices. In this situation, it is desirable to both prevent contact with live components and to allow easy access to devices being maintained. Accordingly, most cabinets include removable access panels or hinged doors by which maintenance personnel may access the interior of the cabinet. However, certain components such as high power contactors, transformers, capacitors, etc., are heavy and/or bulky, whereby external carts or portable supports must be positioned on the outside of the cabinet near the access panel or door to receive the components as they are withdrawn from the cabinet. Positioning such supporting structures near the access portals often impedes access to the cabinet interior, whereby service personnel must lean over the cart to reach the component being removed. In addition to such accessibility issues, switches, interlocks, and other mechanical safety systems must be provided in order to ensure that the devices being serviced are powered down prior to physical access by maintenance personnel. Thus, there is a continuing need for apparatus and methods by which power conversion system components can be safely disconnected from electrical power and withdrawn from cabinets.

SUMMARY

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The invention relates to techniques and systems for electrically disconnecting and allowing external support and access for electrical devices in a power conversion system cabinet. The apparatus includes a support structure that translates a power conversion system component at least partially through a door or other cabinet opening between a first position with the component entirely within the cabinet and a second position with the component supported at least partially outside the cabinet, as well as a power disconnect apparatus operated by translation of the support structure to disconnect the component from electrical power when the support is translated from the first position to the second position.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention are set forth in the following detailed description of the invention when considered in conjunction with the drawings, in which:

FIG. 7 is a partial side elevation view illustrating the contactor positioned on a rolling support truck on a slidable tray having an externally operable handle actuator that operates the support truck and tray from outside the cabinet to translate the support structure and disconnect the supported contactor from electrical power;

FIGS. 8A-8D are side and end elevation views illustrating the exemplary handle actuator in the cabinet of FIGS. 1-7 including a rotatable rod with bars for engaging wheels of the support truck and an end stop for establishing a support truck travel distance to disconnect power from the contactor while the contactor is still entirely within the cabinet;

FIGS. 9A and 9B are side elevation views illustrating the exemplary double telescoping tray in the cabinet of FIGS. 1-7;

FIGS. 11-16 are side perspective views illustrating further details of the exemplary power disconnect and supported component withdrawal apparatus in the cabinet of FIGS. 1-7

DETAILED DESCRIPTION

Figure 1:
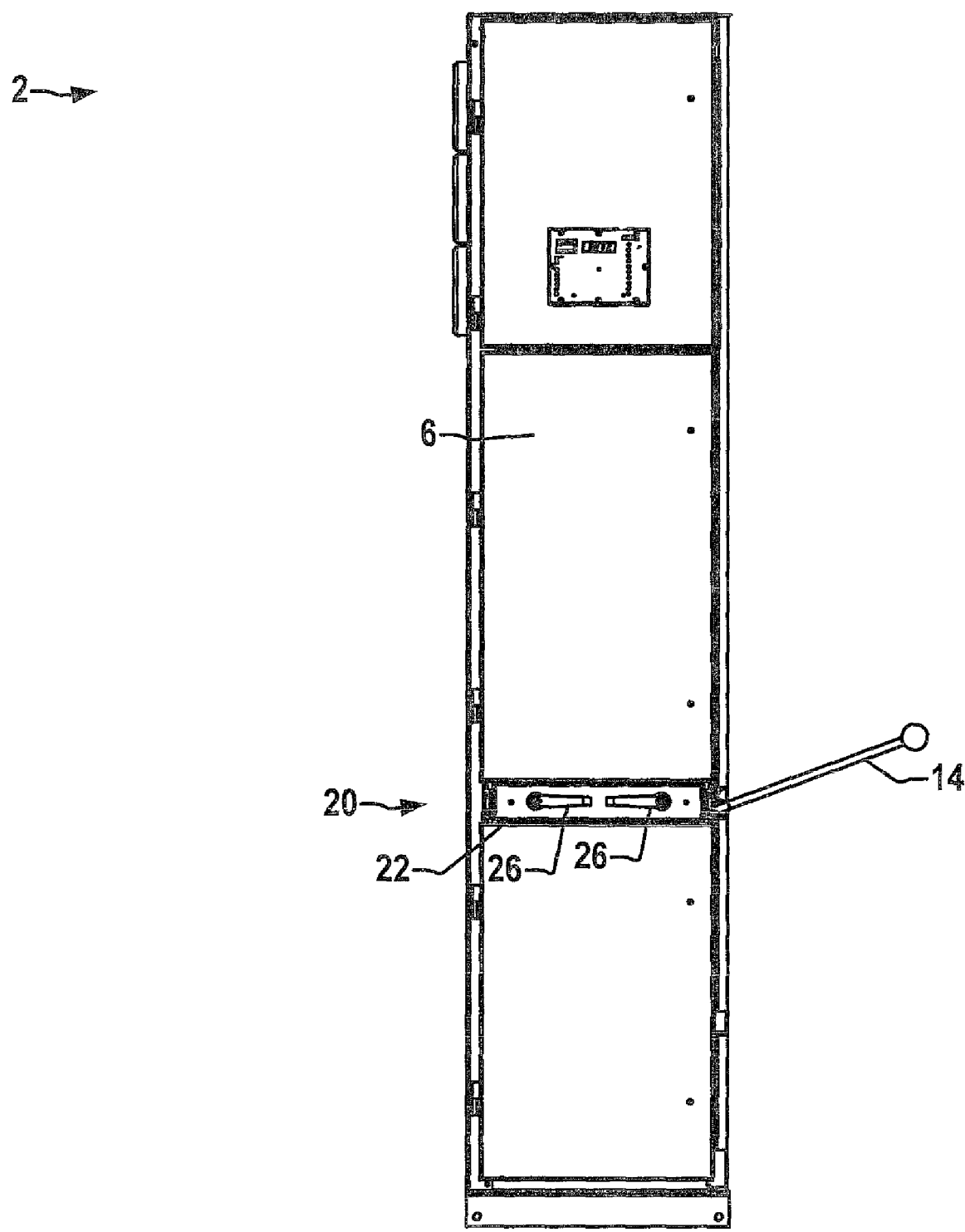
FIG. 1 is a front elevation view illustrating an exemplary power conversion system cabinet with an interoperable power disconnect and supported component withdrawal apparatus supporting a multi-phase AC contactor device.

Referring now to the figures, several embodiments or implementations of the present invention are hereinafter described in conjunction with the drawings, wherein like reference numerals are used to refer to like elements throughout, and wherein the various features are not necessarily drawn to scale. The invention provides power disconnect and supported component withdrawal apparatus and methods for safely providing access to power conversion system components or devices using interoperative combination of a support structure and a power disconnect apparatus. The apparatus and methods may find particular utility when employed in association with motor drives and will be described in the context of an exemplary medium voltage motor drive system, although other embodiments are contemplated in connection with other types and forms of power conversion systems in which one or more system components are desired to be electrically disconnected and then supported wholly or partially outside a cabinet using a single disconnection and support system.

FIGS. 1-6 illustrate an exemplary cabinet 2 housing motor drive power conversion system components including a three-phase contactor device 4 supported in the cabinet 2 by a power disconnect and supported component withdrawal apparatus 20 including a support structure 22 that translates the contactor 4 through a cabinet door 6 between a first position (e.g., FIGS. 2 and 3) with the contactor 4 entirely within the cabinet 2 and a second position (e.g., FIGS. 4 and 5) with the contactor 4 supported at least partially outside the cabinet 2. The apparatus 20 also includes a power disconnect apparatus 24 that is operated by translation of the support structure 22 to disconnect the contactor 4 from electrical power connections or leads 8 when the support 22 is translated from the first position to the second position. The apparatus 20 thus provides rack-out and isolation features for disconnecting the contactor 4 from the power source 8 with the disconnection mechanisms being integrated with and operable by the extendable support 22 so that the contactor 4 can be drawn out and supported for servicing or inspection without the need for additional separate power disconnection means and without the need for a separate support cart or trolley.

Figure 2:
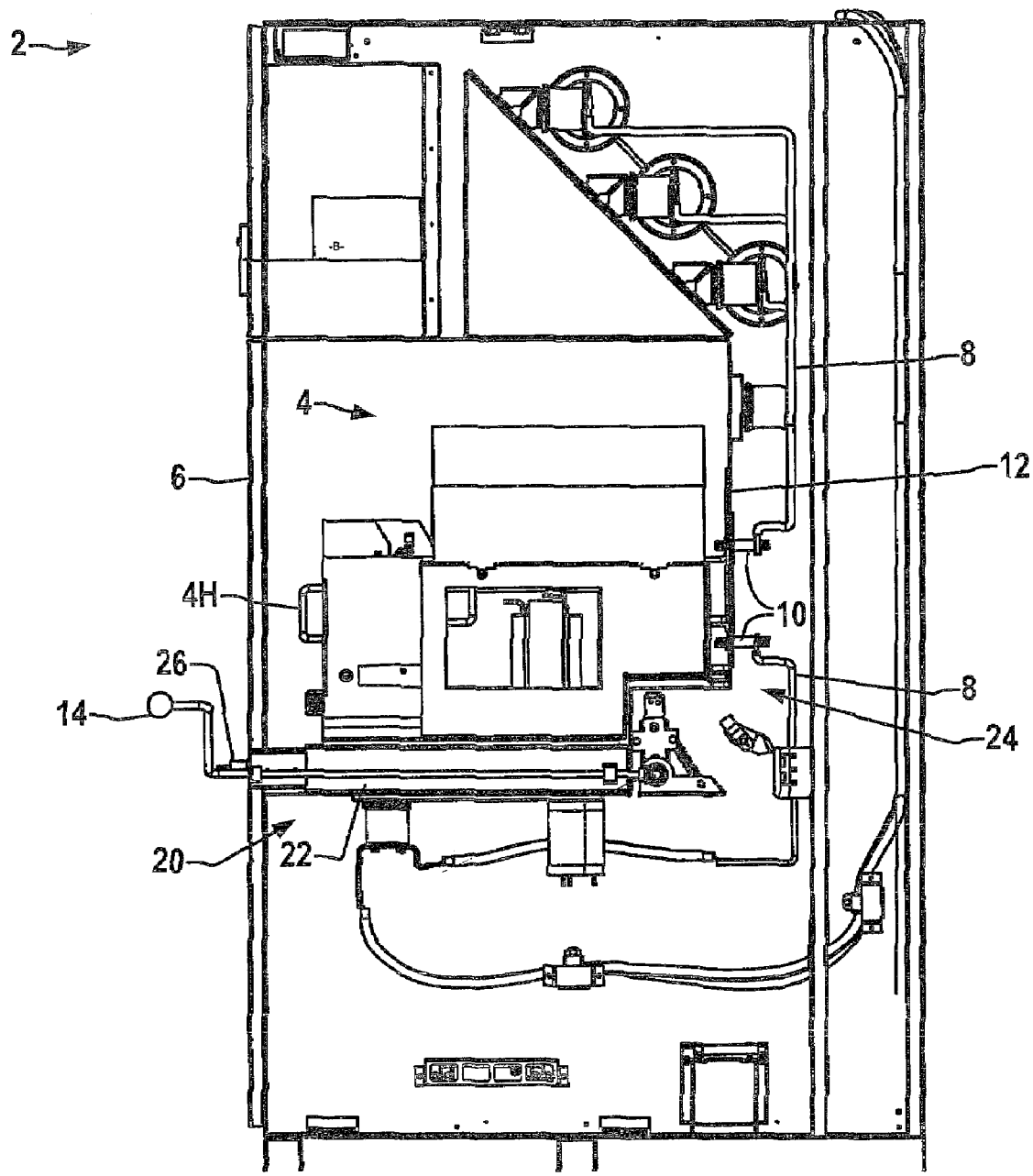
FIG. 2 is a partial side elevation view showing the interior of the cabinet of FIG. 1 with the power disconnect and component withdrawal apparatus retracted and the contactor connected to electrical power within the cabinet.
Figure 3:
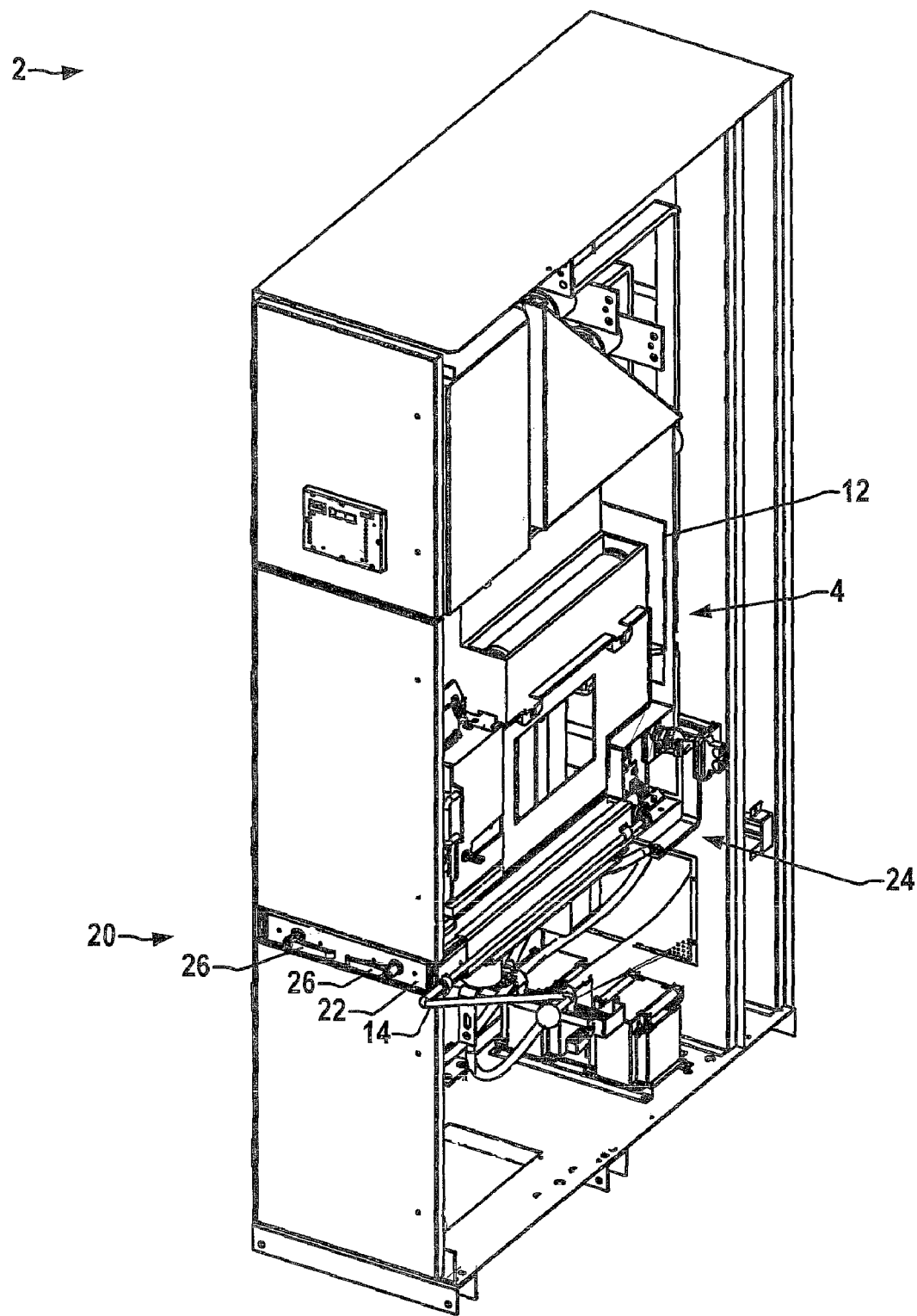
FIG. 3 is a perspective view of the cabinet of FIGS. 1 and 2 with the disconnect and component withdrawal apparatus retracted and the contactor connected to electrical power within the cabinet.
Figure 4:
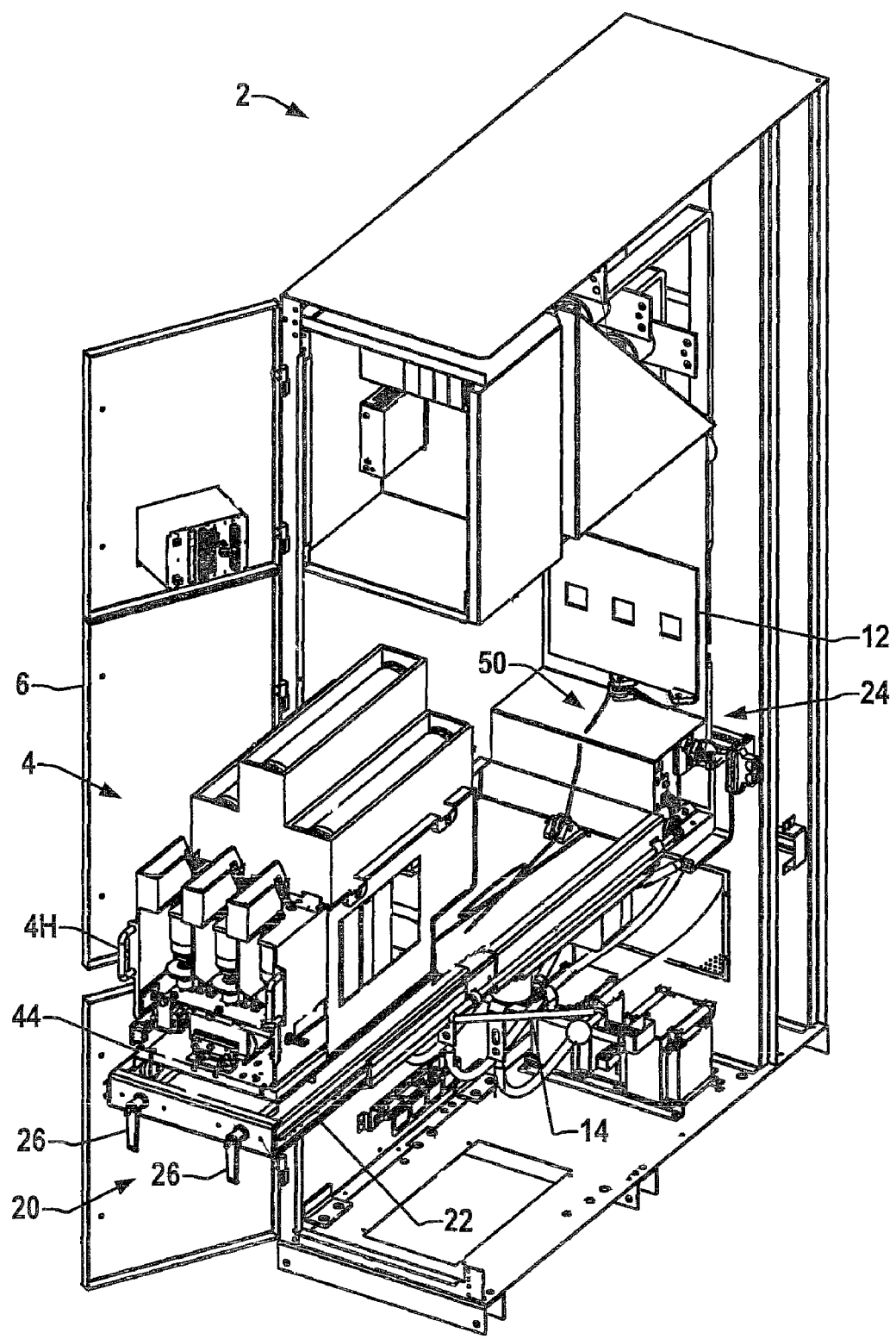
FIGS. 4 and 5 are a perspective views of the cabinet of FIGS. 1-3 with the disconnect and component withdrawal apparatus withdrawn for accessible disconnected support of the contactor outside an opened cabinet door.
Figure 5:
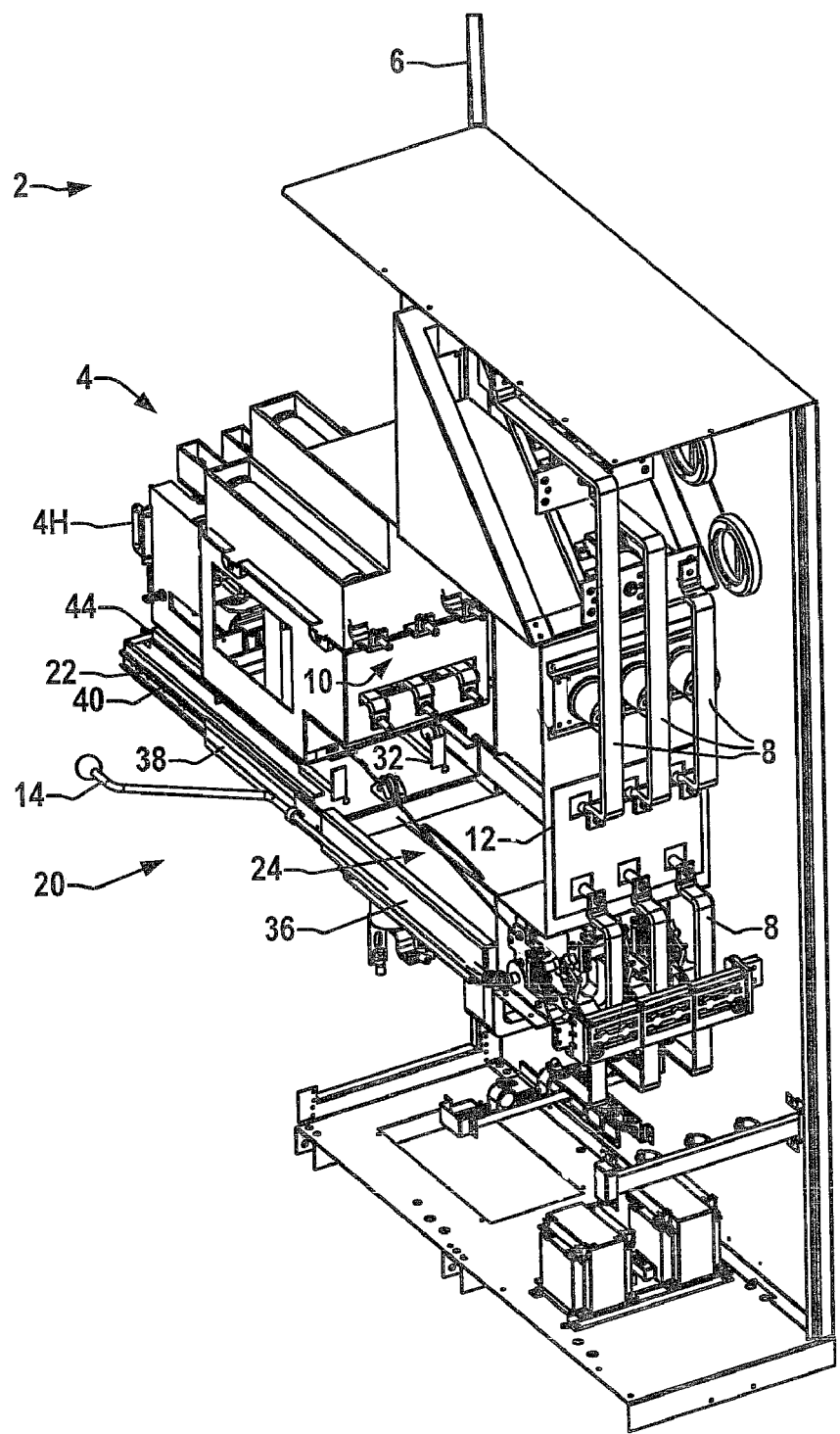

FIGS. 1-3 illustrate the apparatus in the first position with the cabinet door 6 closed and with power leads 8 connected to power terminals 10 of the contactor 4 through a retractable power isolation shutter 12. As best shown in FIG. 3, moreover, the cabinet 2 includes various other components associated with a motor drive including an earthing mechanism actuated by an external lever arm 14, wherein the contactor device 4 in this particular power conversion system provides connection of three phase supply power from an external source to the load driving components of the motor drive (e.g., transformers, switching devices, etc.) and the device 4 comprises an electrical contactor with a transformer and power fuses to constitute a unitary power cell of the motor drive system housed in the cabinet 2.

Referring also to FIGS. 6-9B, FIGS. 6 and 7 illustrate further details of the exemplary apparatus 20, which includes a pair of actuator handles 26 that are located outside the cabinet 2. As best shown in FIGS. 7 and 8A-8C, the actuator handles 26 are operatively coupled with the support structure 22 via rods 28, end stops 30, as well as brackets or tabs 32, with the handles 26 being externally operable from outside the cabinet 2 for rotation and horizontal translation to operate the support structure 22 and the integrated power disconnect apparatus 24 of the integrated system 20.

Figure 6:
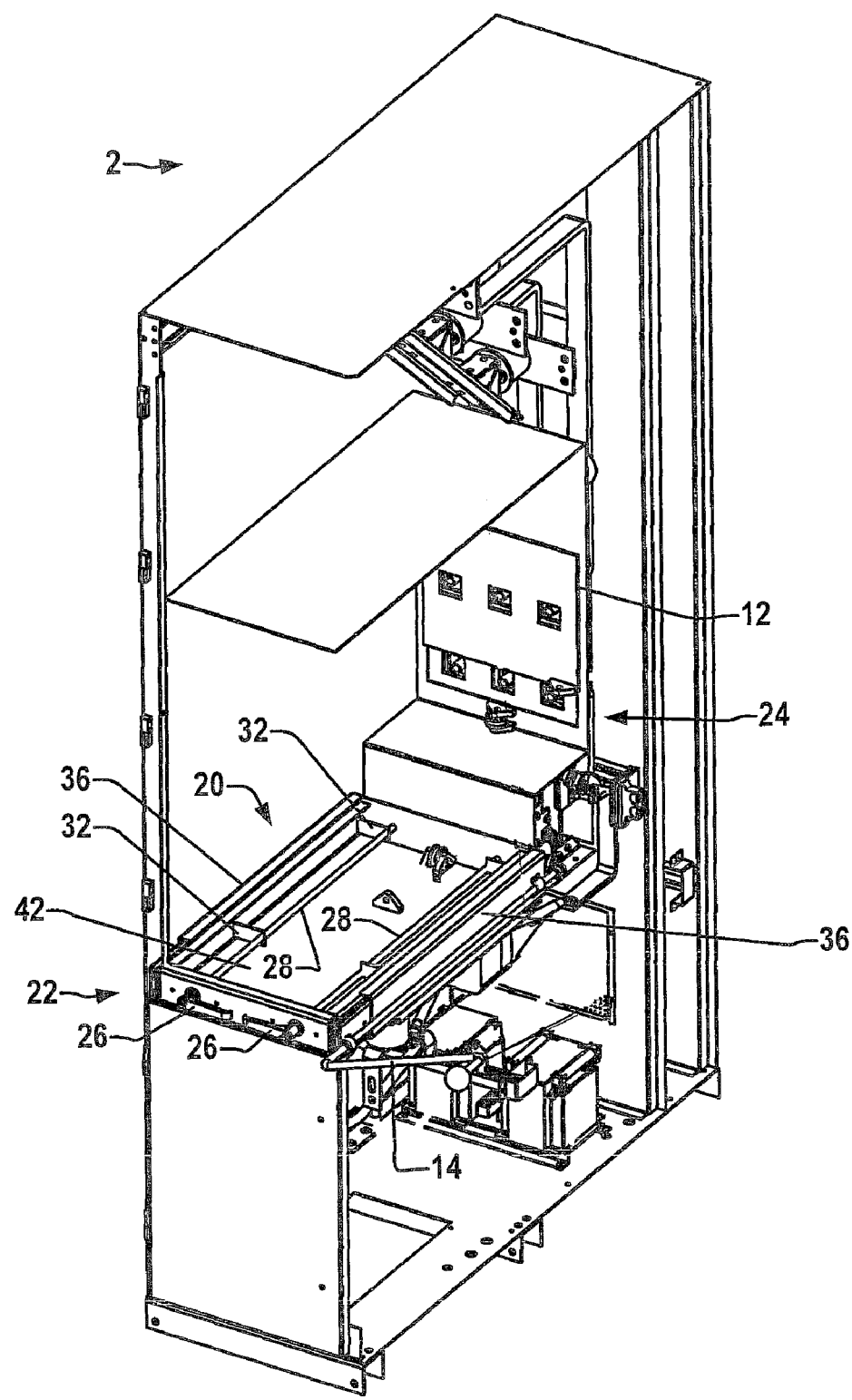
FIG. 6 is a partial perspective view illustrating the cabinet of FIGS. 1-5 with the contactor device removed.

Referring to FIGS. 6, 7, 9A, and 9B, the exemplary support structure 22 includes a double telescoping slidable tray or drawer assembly 34 including a pair of brackets 36 mounted to the cabinet 2, each having with two telescoping arms 38 and 40 with the inner most arms 40 supporting a tray deck 42 (FIG. 6). The contactor 4 is supported on the tray 42 in a rolling support truck 44 having wheels 46 riding on the tray deck 42. As shown in FIGS. 7-8D, when the handles 26 are horizontally oriented as shown in FIGS. 7, 8A, and 8B, the tabs 32 engage the backs of the truck wheels 46 so as to pull the truck outward within the tray drawer assembly 34 with the end stops 30 limiting this forward travel of the truck 44. With the handles rotated 90 degrees to the vertical down positions (FIGS. 8C and 8D), the tabs 32 swing away from the truck wheels 46 and the rods 28 may be provided with further interlocking structures to allow the cabinet door 6 to open when the handles 26 are vertically positioned while preventing the door from opening when the handles 26 are horizontal.

Referring also to FIGS. 10A-10E and 11-16, the tray assembly 34 is slidably translatable between first and second tray positions corresponding to the first and second support structure positions, and the rolling support truck 44 is translatable on the tray deck 42 when the tray assembly 34 is in the first tray position (within the cabinet 2) between a first rolling support position (FIG. 10A) with the contactor 4 connected to electrical power 8 and a second rolling support position (FIG. 10B) with the contactor 4 disconnected from the electrical power 8. In addition, the drawer assembly 34 operates the power disconnect apparatus 24 under control of the handle actuators 24 by pulling on a push-pull cable apparatus 50 (FIGS. 4, 5, 10A-10E) that pulls the power isolation shutter 12 down to block or isolate the accessible portion of the cabinet interior from the power leads 8 when the support truck 44 is rolled to the second rolling support position in FIG. 10B with the contactor leads 10 disconnected from power leads 8. When the truck 44 is fully inserted in the first rolling support position (FIG. 10A), the push-pull cable 50 pushes the shutter 12 upward to allow the contactor terminals 10 to pass through the shutter openings and to engage the power leads 8. This arrangement advantageously facilitates disconnection of electrical power from the contactor 4 and isolation of the power leads 8 using the externally accessible handle actuators 26 prior to opening the cabinet door 6 as described further below.

Figure 10A:
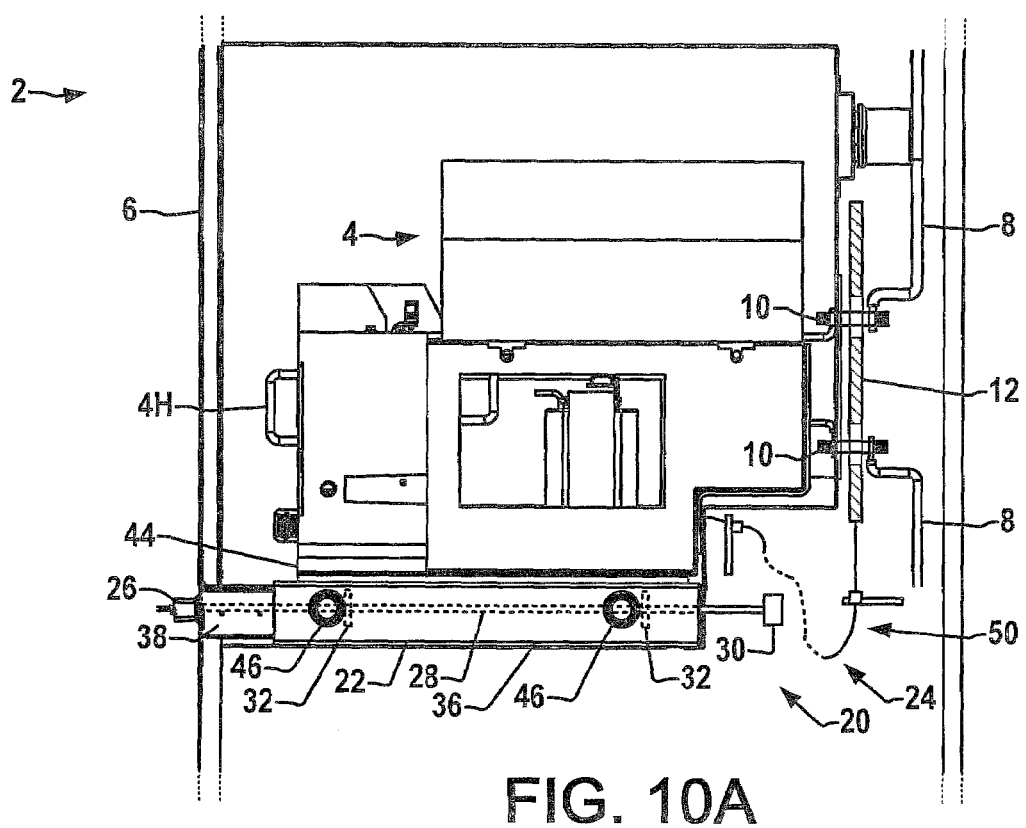
FIGS. 10A and 10B are partial side elevation views showing power disconnection of the contactor in the cabinet using the handle actuators to first roll the support truck within the tray to disconnect the contactor device from electrical power and to actuate a push-pull cable controlled shutter to cover the power connections in the still closed cabinet.
Figure 10B:
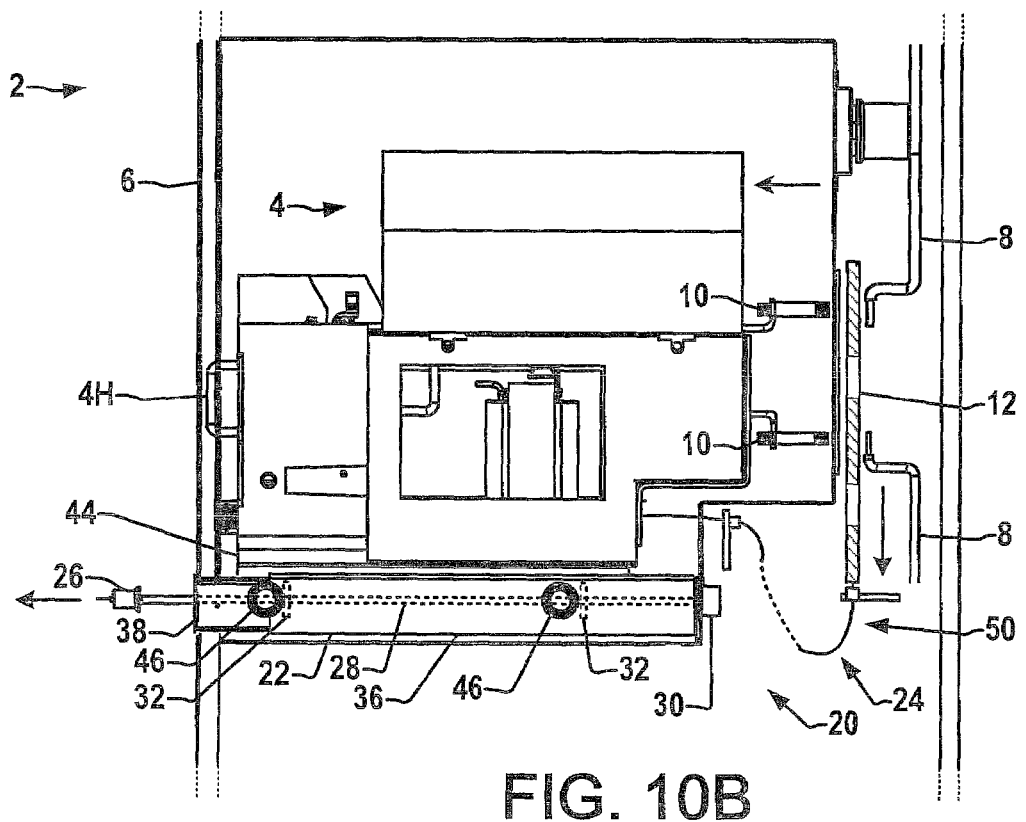

FIGS. 10A and 10B illustrate the disconnection of power from the contactor 4 in the cabinet 6 using the handle actuators 26 to first roll the support truck 44 within the tray 42 to disconnect the contactor electrical terminals 10 from the electrical power connections 8. In operation, the contactor power cell 4 and the terminals 10 thereof are disconnected from the power source leads 8 by an operator pulling on the two handle actuators 26 while in the horizontal positions. In this position (FIG. 10A), the tabs 32 on the handle rods 28 engage behind the wheels 46 of the rolling support truck 44 whereby pulling on the handles 26 causes the truck 44 to move the contactor leads 10 out of contact with the power leads 8 and to pull on the cable assembly 50 so as to lower the shutter 12 to cover the power leads 8, with the stops 30 at the ends of the handle rods 28 limiting the distance that the truck 44 can be withdrawn within the drawer 34. At this point the contactor power cell 4 is completely isolated from the main power 8. Alternative travel limiting means can be used, for instance, where the contactor 4 or the handles thereof may limit the truck travel by engaging the inner door surface. Also, different embodiments are possible in which different shuttering mechanisms can be employed to operate by translation of the truck 44 or other manipulation of the handles 26, including but not limited to gear and spring mechanisms, gravity and spring force with interference switches, scissor lift devices, etc. In either case, the truck travel distance is sufficient to disengage the power connections 8, 10 and to operate the isolation shutter 12 via the push-pull cable assembly 50 as shown in FIG. 10B.

Figure 10C:
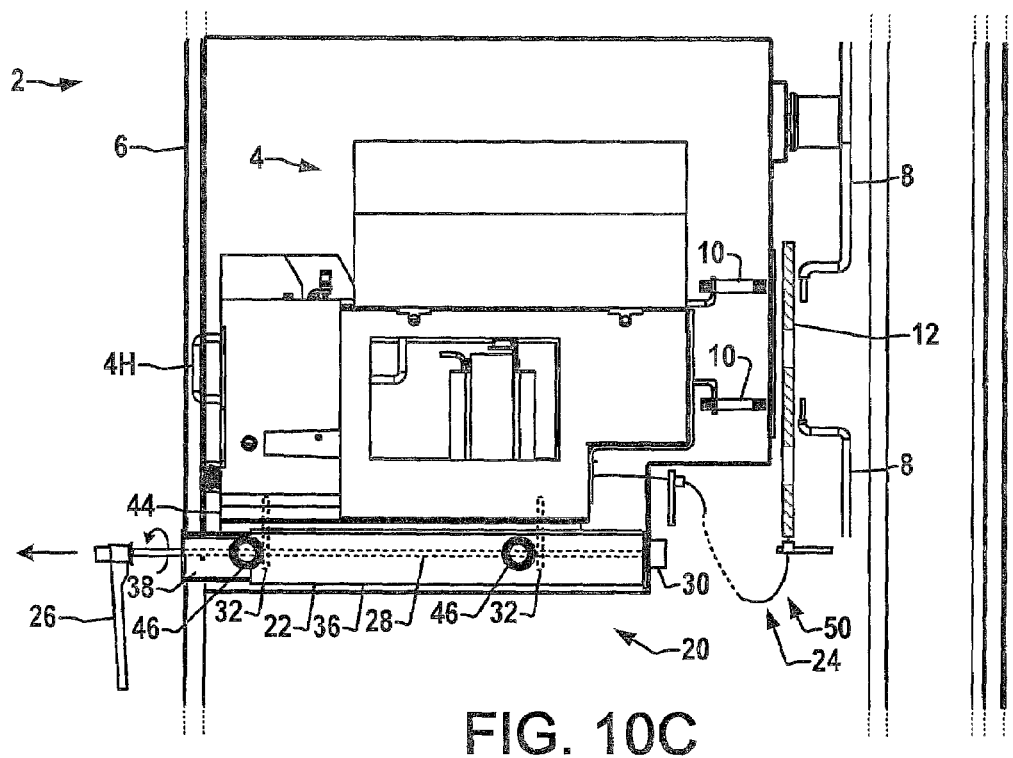
FIGS. 10C-10E are partial side elevation views showing the further withdrawal of the contactor from the cabinet by rotating the handle actuators to allow opening of the cabinet door and then extending the telescoping slidable drawer to support the contactor outside the cabinet.
Figure 10D:
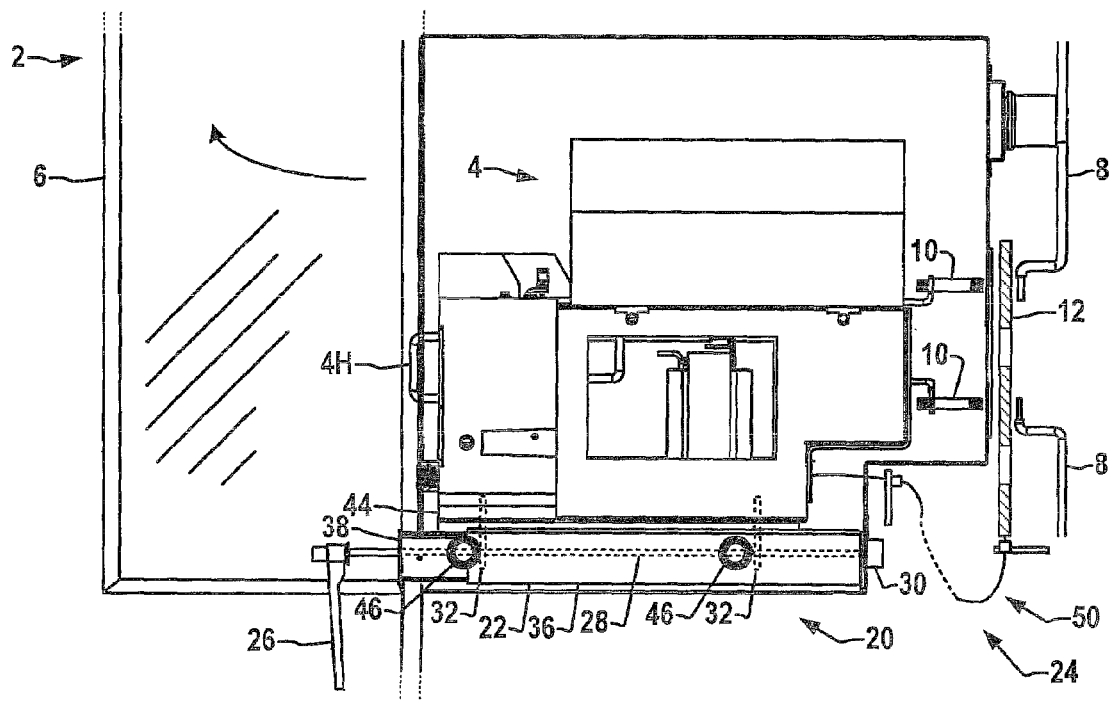
Figure 10E:
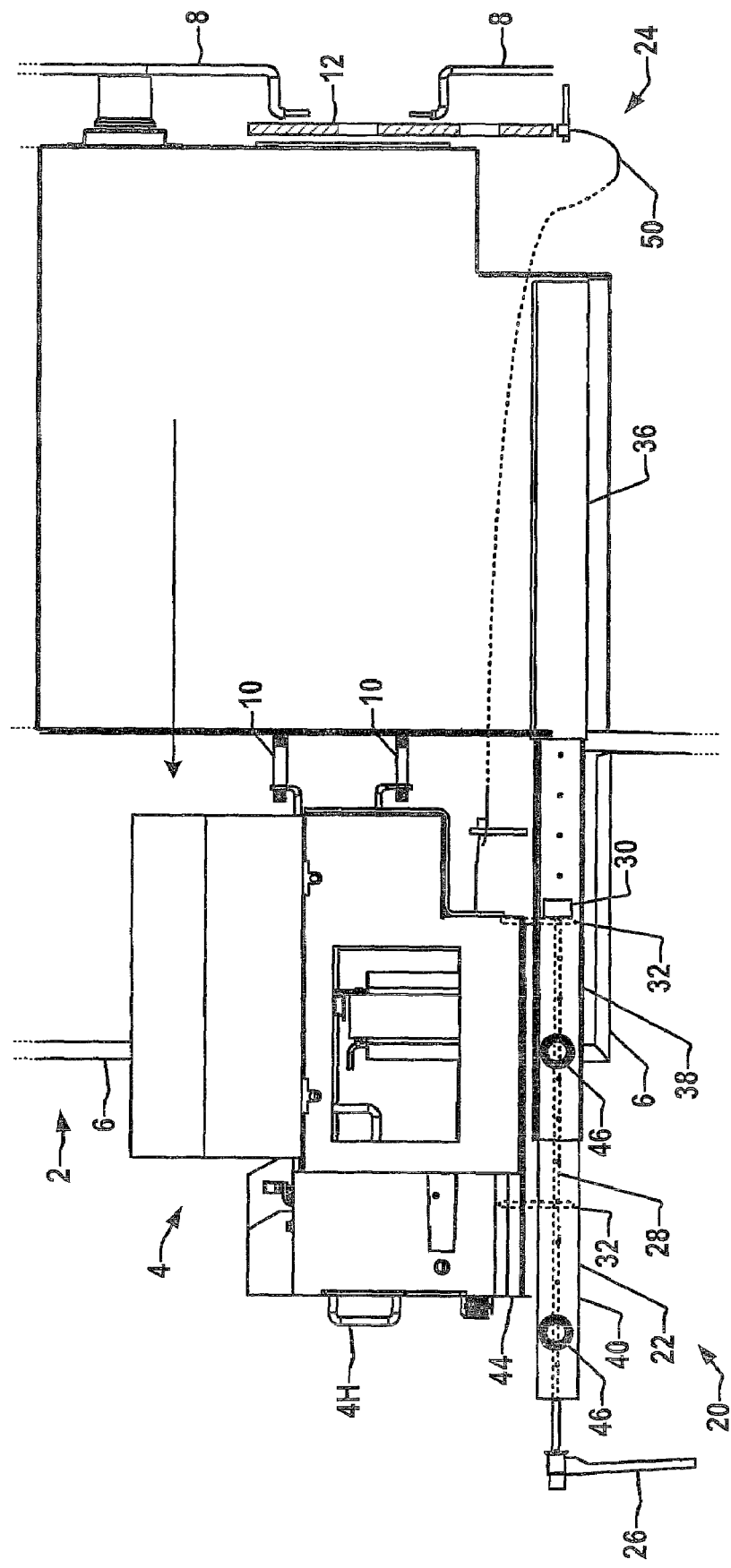
Figure 12:
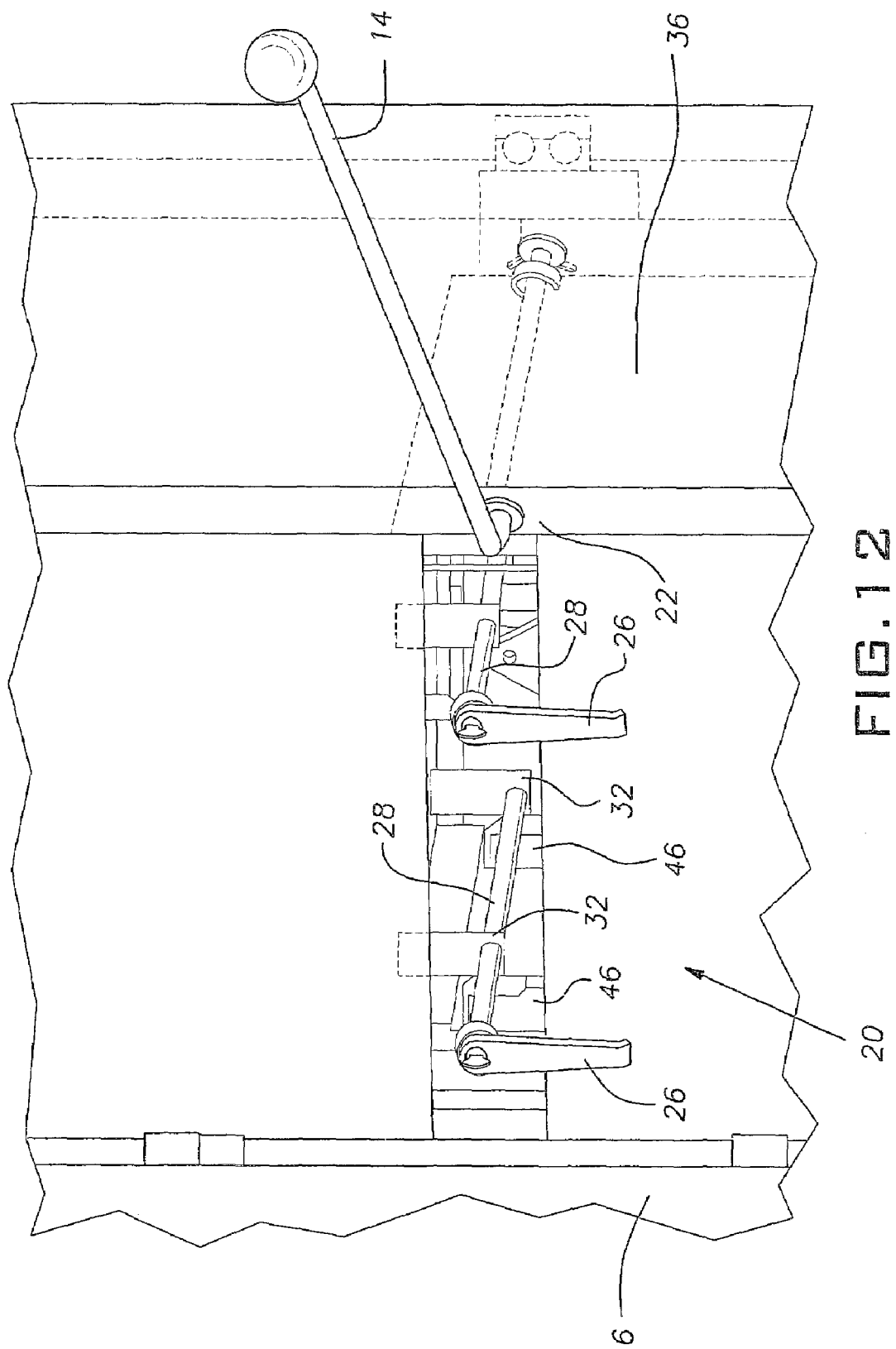
Figure 13:
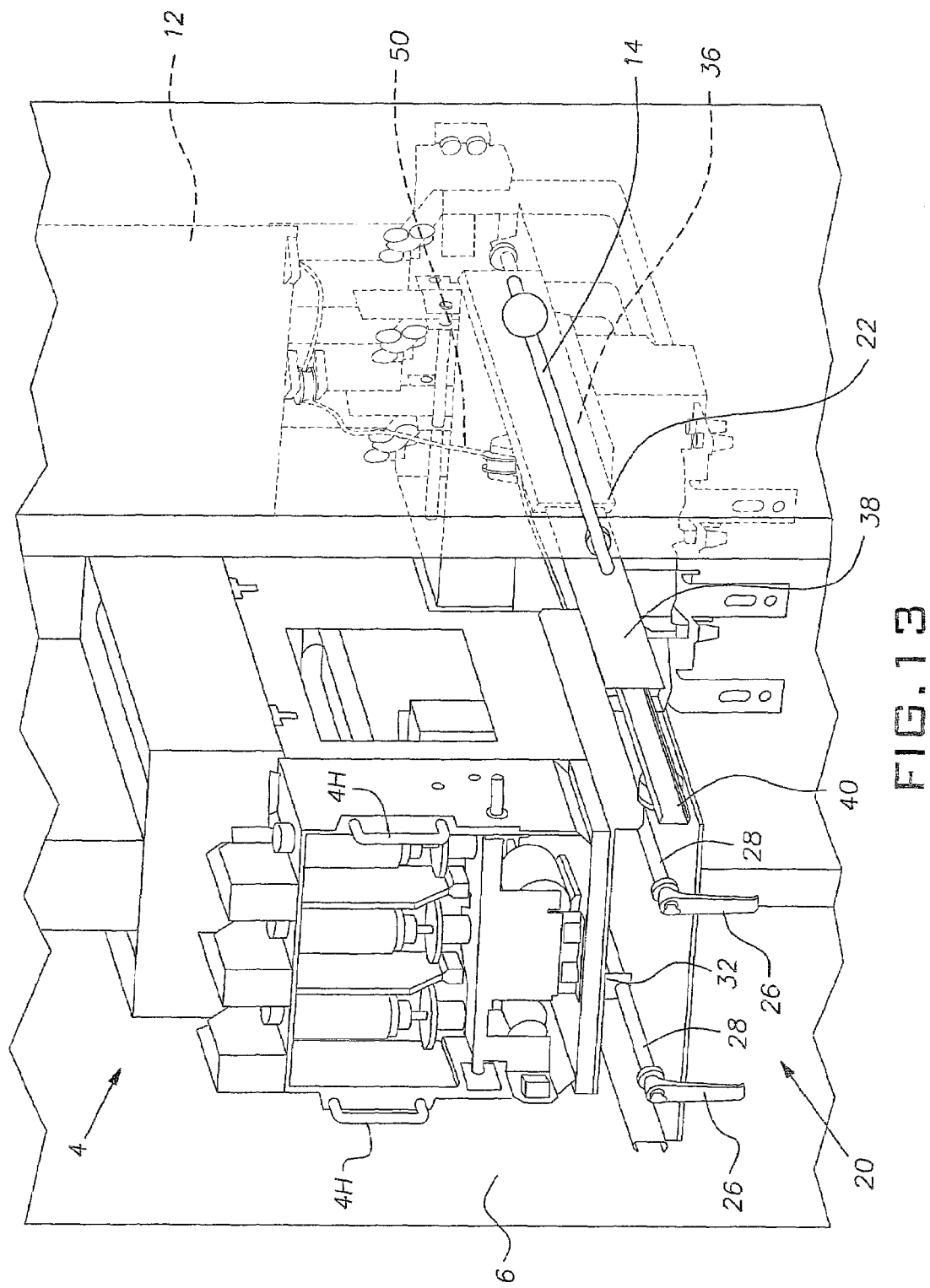
Figure 14:
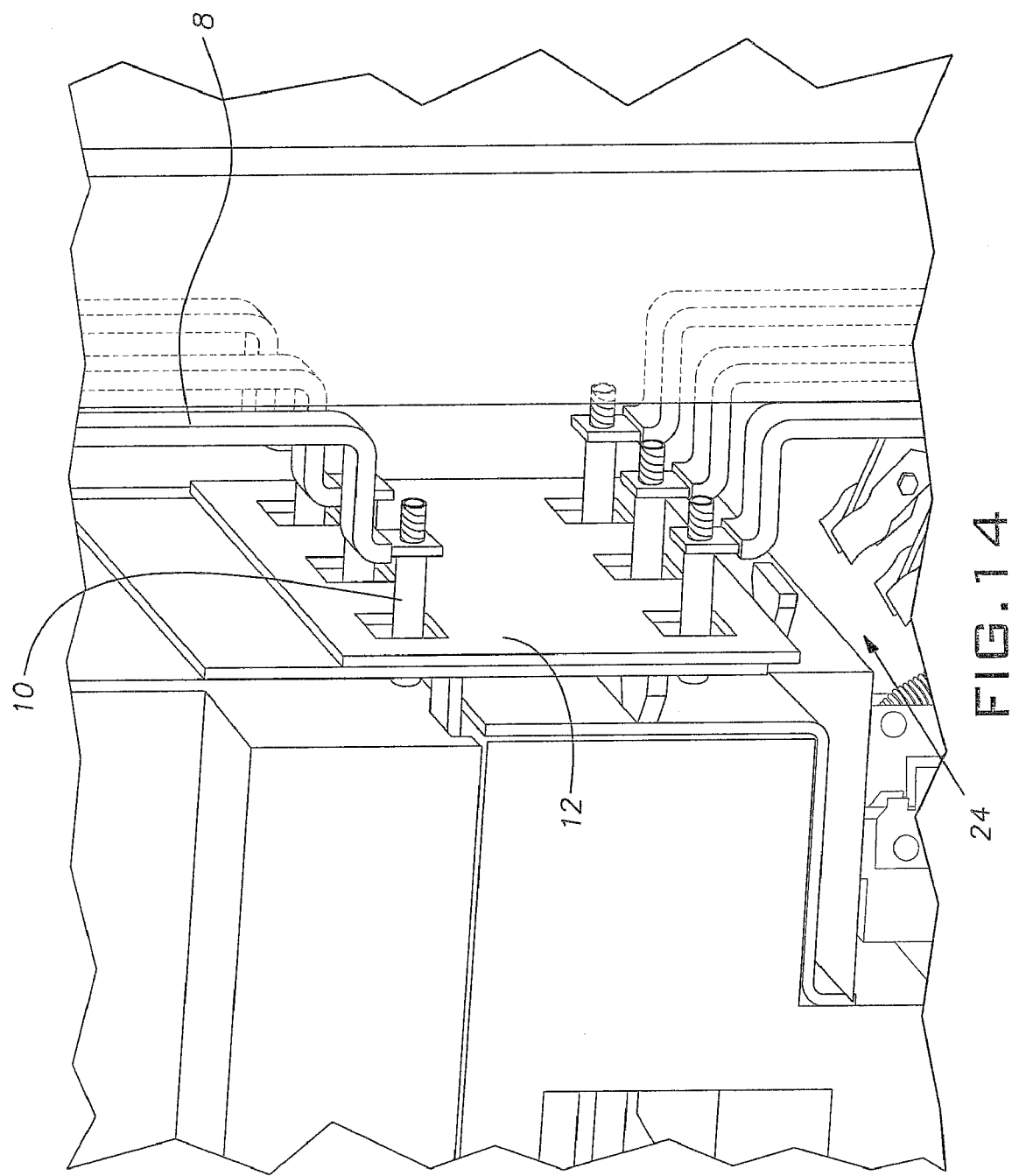
Figure 15:
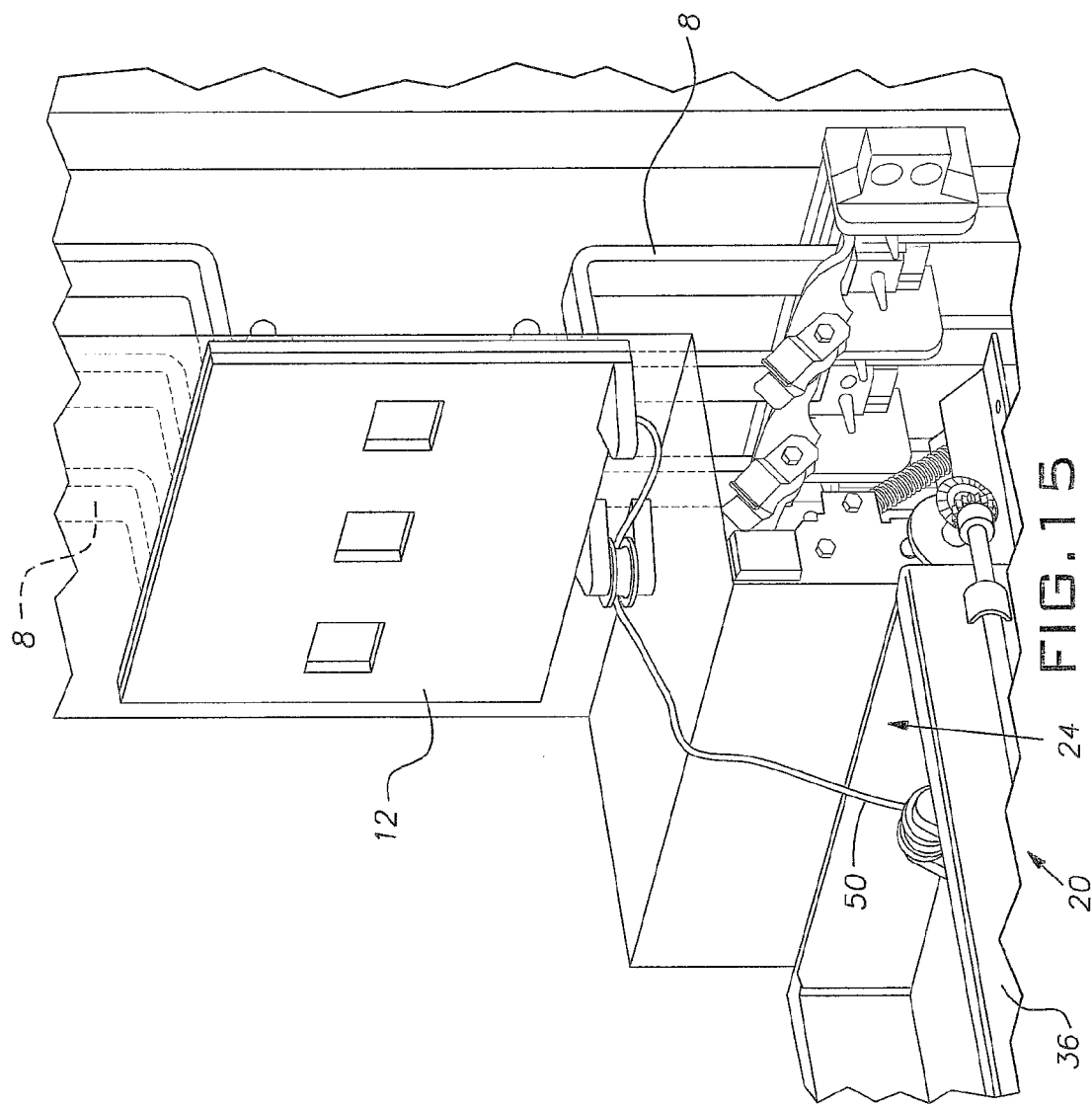
Figure 16:
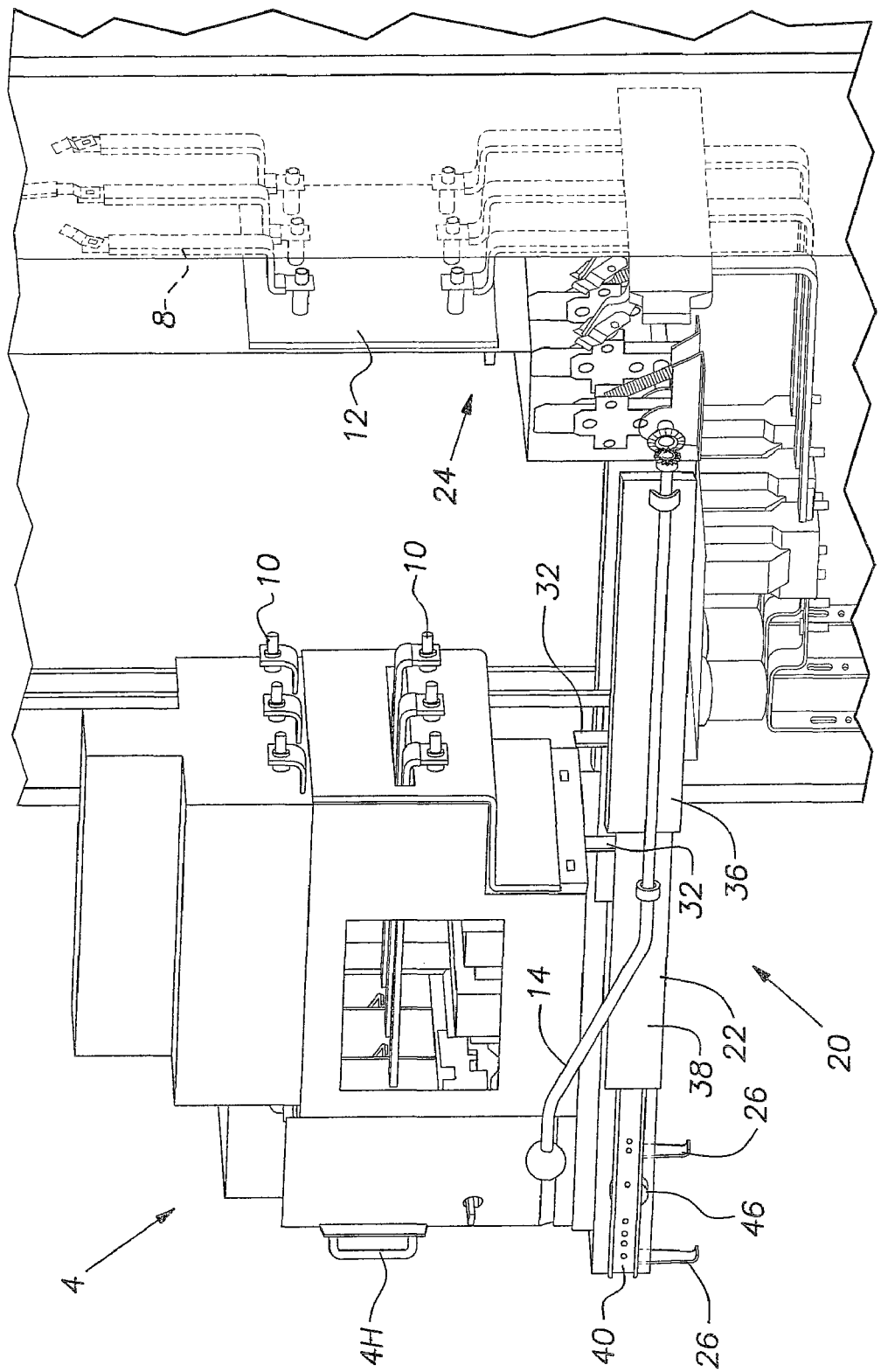

Referring also to FIGS. 10C-10E, at this point, further retraction of the operator handles 26 is limited by the end stops 30 and/or by the door 6. To finish withdrawal of the contactor 4 from the cabinet 2, the handle actuators 26 are rotated in FIG. 10C to the vertical down positions (e.g., FIGS. 8C and 8D). In this embodiment, rotation of the handles 26 disengages the brackets 32 along the rods 28 from behind the wheels 46 of the truck 44 and also shifts an interlocking bracket by 90 degrees in order to remove a mechanical interlocking interference (not shown) from behind the enclosure door 6. At this point, therefore, the device 4 is safely disconnected from the power leads 8 and the leads 8 are isolated or blocked by the shutter 12, whereby the accessible portion of the cabinet interior is free of electrical hazards. The operator can then safely open the cabinet door 6 as shown in FIG. 10D. Thereafter in FIG. 10E, the operator may pull on the handles 26 and/or on handles 4H of the contactor 4 to extend the telescoping components 38 and 40 of the slidable drawer assembly 34 to support the contactor 4 outside the cabinet 2.

To reconnect the power cell truck to the main power, the user pushes the truck back to the first rolling support truck position within the tray assembly 34 and slides the telescoping tray assembly 34 back inside the cabinet structure 2 with the handles 26 in the vertical down position and closes the door 6. The handles 26 are then rotated to the horizontal starting position to engage the fronts of the truck wheels 46 with the bracket tabs 32 and the handles 26 are pushed to simultaneously lift the isolating shutter 12 via the push-pull cable 50 and to re-engage the contactor leads 10 with the power terminals 8. The handles 26 may then be rotated vertically again and pushed back to their fully retracted positions, after which the handles can be rotated back to their starting horizontal orientation. In this manner, the shutter keeps the power terminals obstructed and the device powered down until after the door 6 is closed.

The above implementations are merely examples of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. An apparatus for disconnecting and allowing external support and access for electrical devices in a power conversion system cabinet, comprising:
   a support structure mounted in a power conversion system cabinet to support at least one power conversion system component, the support structure being at least partially translatable through an opening in a power conversion system cabinet between a first support structure position with the power conversion system component entirely within the cabinet and a second support structure position in which the power conversion system component is supported with at least a portion of the power conversion system component is outside the cabinet, wherein the support structure includes:
      a tray slidable between first and second tray positions corresponding to the first and second support structure positions; and
      a rolling support located on the tray and translatable on the tray when the tray is in the first tray position between a first rolling support position with the power conversion system component connected to electrical power and a second rolling support position with the power conversion system component disconnected from electrical power; and
   a power disconnect apparatus operatively coupled with the support structure to disconnect the power conversion system component from electrical power.

2. The apparatus of claim 1, wherein the power disconnect apparatus is operatively coupled with the support structure to connect the power conversion system component to electrical power when the support structure is translated from the second support structure position to the first support structure position.

3. The apparatus of claim 1, wherein the power conversion system component is supported entirely within the cabinet when the tray is in the first tray position and the rolling support is in the first or second rolling support positions.

4. The apparatus of claim 1, wherein the power disconnect apparatus is operative to connect the power conversion system component to electrical power when the rolling support is translated from the second rolling support position to the first rolling support position.

5. The apparatus of claim 4, wherein the power disconnect apparatus comprises a power obstruction structure operatively coupled with the rolling support to obstruct access to electrical power within the cabinet when the rolling support is in the second rolling support position.

6. The apparatus of claim 5, wherein the power disconnect apparatus comprises a push-pull cable apparatus operatively coupled between the power obstruction structure and the rolling support and operable to translate the power obstruction structure between a first obstruction position to allow connection of the power conversion system component to electrical power when the rolling support is in the first rolling support position and a second obstruction position to obstruct access to electrical power within the cabinet when the rolling support is in the second rolling support position.

7. The apparatus of claim 1, further comprising at least one actuator operatively coupled with the rolling support, the actuator being located outside the cabinet and externally operable to translate the tray between the first and second tray positions and to translate the tray between the first and second tray positions.

8. The apparatus of claim 1, wherein the power disconnect apparatus comprises a power obstruction structure operatively coupled with the support structure to obstruct access to electrical power within the cabinet when the support structure is in the second support structure position.

9. The apparatus of claim 1, wherein the cabinet includes a door operable to selectively cover the opening in the cabinet, and wherein the power disconnect apparatus is operable to prevent the door from opening until after the power conversion system component is disconnected from electrical power.

10. The apparatus of claim 9, wherein the power disconnect apparatus is operative to connect the power conversion system component to electrical power when the rolling support is translated from the second rolling support position to the first rolling support position.

11. The apparatus of claim 10, wherein the power disconnect apparatus comprises a power obstruction structure operatively coupled with the rolling support to obstruct access to electrical power within the cabinet when the rolling support is in the second rolling support position.

12. The apparatus of claim 9, further comprising at least one actuator operatively coupled with the rolling support, the actuator being located outside the cabinet and externally operable to translate the tray between the first and second tray positions and to translate the tray between the first and second tray positions.

13. The apparatus of claim 12, wherein the at least one actuator includes an externally operable handle coupled with a rod having a longitudinal axis and a bracket extending transversely outward from the rod, the rod being rotatable about the longitudinal axis via the handle to translate the bracket between a first bracket position with the bracket disengaged from the rolling support and a second bracket position in which the bracket is operable to engage the rolling support and to translate the rolling support between the first and second rolling support positions by pushing or pulling the handle in a direction generally parallel to the longitudinal axis.

14. The apparatus of claim 9, wherein the power disconnect apparatus is operatively coupled with the support structure to connect the power conversion system component to electrical power when the support structure is translated from the second support structure position to the first support structure position.

15. The apparatus of claim 14, wherein the power disconnect apparatus is operable to connect the power conversion system component to electrical power only when the door is closed.

16. An apparatus for disconnecting and allowing external support and access for electrical devices in a power conversion system cabinet, comprising:
a support structure mounted in a power conversion system cabinet to support at least one power conversion system component, the support structure being at least partially translatable through an opening in a power conversion system cabinet between a first support structure position with the power conversion system component entirely within the cabinet and a second support structure position in which the power conversion system component is supported with at least a portion of the power conversion system component is outside the cabinet, wherein the support structure includes:
a tray slidable between first and second tray positions corresponding to the first and second support structure positions; and
a rolling support located on the tray and translatable on the tray when the tray is in the first tray position between a first rolling support position with the power conversion system component connected to electrical power and a second rolling support position with the power conversion system component disconnected from electrical power;
a power disconnect apparatus operatively coupled with the support structure to disconnect the power conversion system component from electrical power when the support structure is translated from the first support structure position to the second support structure position;
at least one actuator operatively coupled with the rolling support, the at least one actuator being located outside the cabinet and externally operable to translate the tray between the first and second tray positions and to translate the tray between the first and second tray positions;
wherein the at least one actuator includes an externally operable handle coupled with a rod having a longitudinal axis and a bracket extending transversely outward from the rod, the rod being rotatable about the longitudinal axis via the handle to translate the bracket between a first bracket position with the bracket disengaged from the rolling support and a second bracket position in which the bracket is operable to engage the rolling support and to translate the rolling support between the first and second rolling support positions by pushing or pulling the handle in a direction generally parallel to the longitudinal axis.

17. A method of electrically disconnecting and allowing external support and access for electrical devices in a power conversion system cabinet, the method comprising:
concurrently disconnecting power from an electrical device in the cabinet and covering power terminals in the cabinet while a cabinet door is closed;
opening the cabinet door to uncover an opening in the cabinet;
translating a retractable support structure outward to move at least a portion of the electrical device outside the cabinet through the opening with the electrical device supported on the support structure, wherein translating the retractable support structure includes sliding a tray between a first tray position with the power conversion system component entirely within the cabinet and a second tray position in which the power conversion system component is supported with at least a portion of the power conversion system component is outside the cabinet.

18. The method of claim 17, further comprising:
translating the retractable support inward to move the electrical device entirely within the cabinet while the power terminals in the cabinet remain covered;
closing the cabinet door; and
concurrently uncovering power terminals in the cabinet and connecting power to the electrical device in the cabinet while a cabinet door is closed.

19. The apparatus of claim 16, wherein the cabinet includes a door operable to selectively cover the opening in the cabinet, and wherein the power disconnect apparatus is operable to prevent the door from opening until after the power conversion system component is disconnected from electrical power.

* * * * *